April 7, 1959

C. H. CURREY 2,881,417

DECIMAL-TO-BINARY CONVERTER FOR SYSTEM FOR RECORDING LISTENING OR VIEWING HABITS OF WAVE SIGNAL RECEIVER USERS

Filed Sept. 21, 1953

4 Sheets-Sheet 1

INVENTOR.
Charles H. Currey
BY Mason, Kolehmainen, Rathburn & Wyss
Attorneys

April 7, 1959

C. H. CURREY 2,881,417

DECIMAL-TO-BINARY CONVERTER FOR SYSTEM FOR RECORDING LISTENING OR VIEWING HABITS OF WAVE SIGNAL RECEIVER USERS

Filed Sept. 21, 1953

4 Sheets-Sheet 2

INVENTOR.
Charles H. Currey
BY
Mason, Kolehmainen, Rathburn & Wyss
Attorneys

April 7, 1959

C. H. CURREY

DECIMAL-TO-BINARY CONVERTER FOR SYSTEM FOR RECORDING LISTENING OR VIEWING HABITS OF WAVE SIGNAL RECEIVER USERS 2,881,417

Filed Sept. 21, 1953

4 Sheets-Sheet 3

INVENTOR.
Charles H. Currey
BY Mason, Kolehmainen, Rathburn & Wyss
Attorneys

April 7, 1959

C. H. CURREY

DECIMAL-TO-BINARY CONVERTER FOR SYSTEM FOR RECORDING LISTENING OR VIEWING HABITS OF WAVE SIGNAL RECEIVER USERS 2,881,417

Filed Sept. 21, 1953

4 Sheets-Sheet 4

INVENTOR.
Charles H. Currey
BY
Mason, Kolehmainen, Rathburn & Wyss
Attorneys

United States Patent Office 2,881,417

Patented Apr. 7, 1959

2,881,417

DECIMAL-TO-BINARY CONVERTER FOR SYSTEM FOR RECORDING LISTENING OR VIEWING HABITS OF WAVE SIGNAL RECEIVER USERS

Charles H. Currey, Palatine, Ill., assignor to A. C. Nielsen Company, Chicago, Ill., a corporation of Illinois Application September 21, 1953, Serial No. 381,344

4 Claims. (Cl. 340—347)

Figure 1:
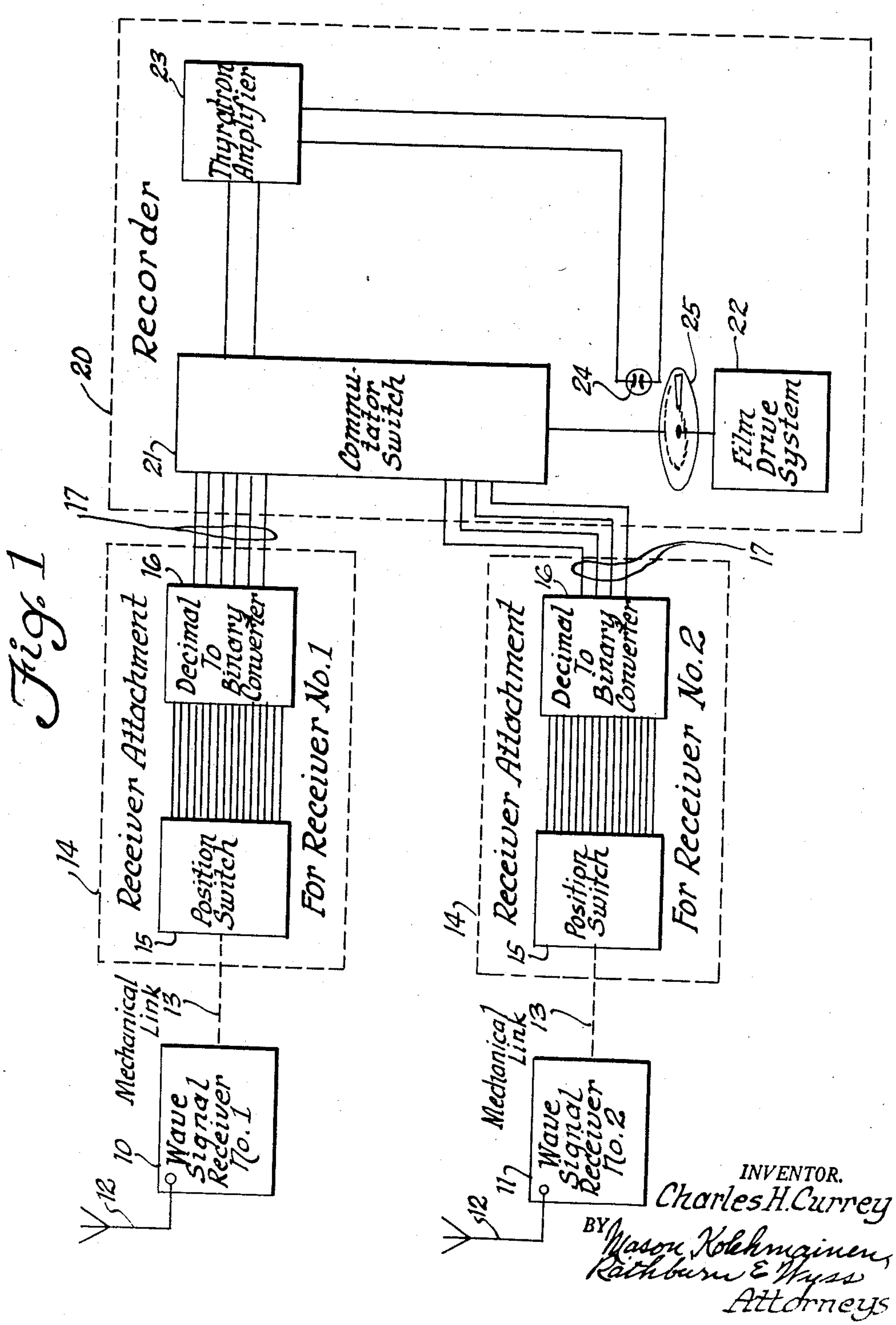

The present invention relates to a system and apparatus for indicating or recording the listening habits or viewing habits in the case of television or wave signal receiver users. More specifically, the present invention relates to an improved device for converting a decimal representation of the channels to which a wave signal receiver might be tuned to a binary representation. The present invention is an improvement on the arrangement disclosed in copending Krahulec application, Serial No. 147,302, filed March 2, 1950, and assigned to the same assignee as the present application, now Patent No. 2,838,359.

For many years it has been accepted that the instrumented method of determining the listening and viewing habits of wave signal receiver users is the only accurate means of obtaining data in this regard. Such instrumented methods generally employ a recording device operating in conjunction with a receiver in the home of each collaborator to record as a function of time the wave signal transmitters to which the logged or monitored receiver is tuned for signal reception, whereupon this recorded information is made available to an analysis organization or a research organization for conversion to useful data with reference to the effectiveness of radio and television advertising and the like. The collaborator homes are chosen on a nationwide basis or on some other geographical basis so as to be truly representative of the radio and television audiences throughout the area under consideration. If the area under consideration is the entire United States, then the collaborator homes will be located throughout the entire United States. Moreover, these homes will be chosen on a basis such as to be truly representative of the listening or viewing audience in the geographical area under consideration.

Prior to the above-mentioned Krahulec application, the record produced by such instrumented methods generally comprised indications on a suitable recording medium such as a tape or the like, and the different stations were indicated by the transverse positions of the indications across the tape, such indications being representative of the particular tuning condition at certain times, time being indicated longitudinally along the tape. Unfortunately, the applying of record indications to the recording medium in a manner whereby the transverse position on the tape is representative of the tuning condition does not lend itself to the most efficient automatic operation from the standpoint of converting the data recorded on the recording medium to other data useful in the final statistical analysis. In the above-mentioned Krahulec application there is disclosed an arrangement in which the recorded information was converted before recording from a decimal representation of the particular tuning channel tuned in by the receiver to a binary representation which lent itself much more to high speed reading or decoding and made it possible to supply the recorded information directly to an electronic digital computer or similar apparatus. It would be desirable to provide an improved arrangement over that shown in the above-mentioned Krahulec application.

The percentage of multireceiver homes has increased tremendously in recent years. Where some years ago the number of homes that had more than one receiver were relatively few in number, today the number of homes having two or more wave signal receivers is very high. Obviously, to get an accurate picture of the listening and viewing habits of wave signal receiver users, it is important to provide a simple arrangement for recording the listening or viewing habits of all the receivers in those homes chosen as representative of the listening audience. One system in extensive commercial use today to speed up the process of obtaining the listening or viewing information and converting it to usable data for radio advertisers and the like embodies the arrangement of mailable record magazines which are supplied to the collaborator homes, and someone in the collaborator home replaces the magazine into which the recorded information for a predetermined period is contained with a newly supplied magazine, so that the information recorded during a subsequent period may be subsequently contained therein. This system of having the collaborator mail the magazines back to the analysis organization and replace the magazines at periodic intervals has proven to be very satisfactory and has greatly reduced the cost of obtaining the necessary recorded information. It is very important that the information from a particular monitored receiver is at all times known and related to the particular receiver involved. It will be appreciated that in a multireceiver home, if a collaborator must handle separate magazines for each receiver, there is the possibility of mixing up the magazines whereby the proper information will not be allocated to the proper receiver. It would be desirable, therefore, to provide an arrangement whereby in a multireceiver home all of the recorded information from a plurality of receivers will be recorded on a single recording element and properly designated on the recording element thereby eliminating any confusion arising from an improper association of the magazines with the receivers. Such an arrangement requires that information from several receivers which might be widely spaced in the home (receivers are commonly located in the living room, kitchen and various bedrooms) must be transmitted to a common recording point. It will be apparent that the information to be recorded might be transmitted to such common recording point by being superimposed on the power lines or the like, but numerous problems are introduced when this is done. The same is true if the information is transmitted over a space link. It has been found most satisfactory and most economical to transmit the information from receiver to recorder over conductors whose sole function is to transmit this information. Obviously, if information of the tuning condition of a receiver tunable to a large number of different channels is to be transmitted to a recording station by means of conductors in a home, the fewer the conductors, the smaller the size of these conductors, and the lower the voltage on these conductors, the more satisfactory is the arrangement. It would be desirable to provide such an arrangement in which the information may be transmitted to a common point over a relatively few conductors, even though many tuning channels are involved, and such that the conductors provide a circuit free from fire and shock hazards.

Accordingly, it is an object of the present invention to provide a new and improved decimal-to-binary converter.

It is another object of the present invention to provide a new and improved decimal-to-binary converter for use in indicating or recording information of the listening or viewing habits of wave signal receiver users.

It is another object of the present invention to provide in a system for recording the tuning condition of wave signal receivers in a multiple receiver home, a high impedance low power drain circuit which is relatively free from fire or shock hazards.

It is another object of the present invention to provide an improved decimal-to-binary converter involving no moving elements and which permits use in a system for recording the listening or viewing habits of all receivers in a multiple receiver home, with a minimum number of conductors interconnecting the receivers and the recorder in such home.

Further objects and advantages of the present invention will become apparent as the following description proceeds, and the features of novelty which characterize the invention will be pointed out with particularity in the claims annexed to and forming a part of this specification.

Figure 2A:
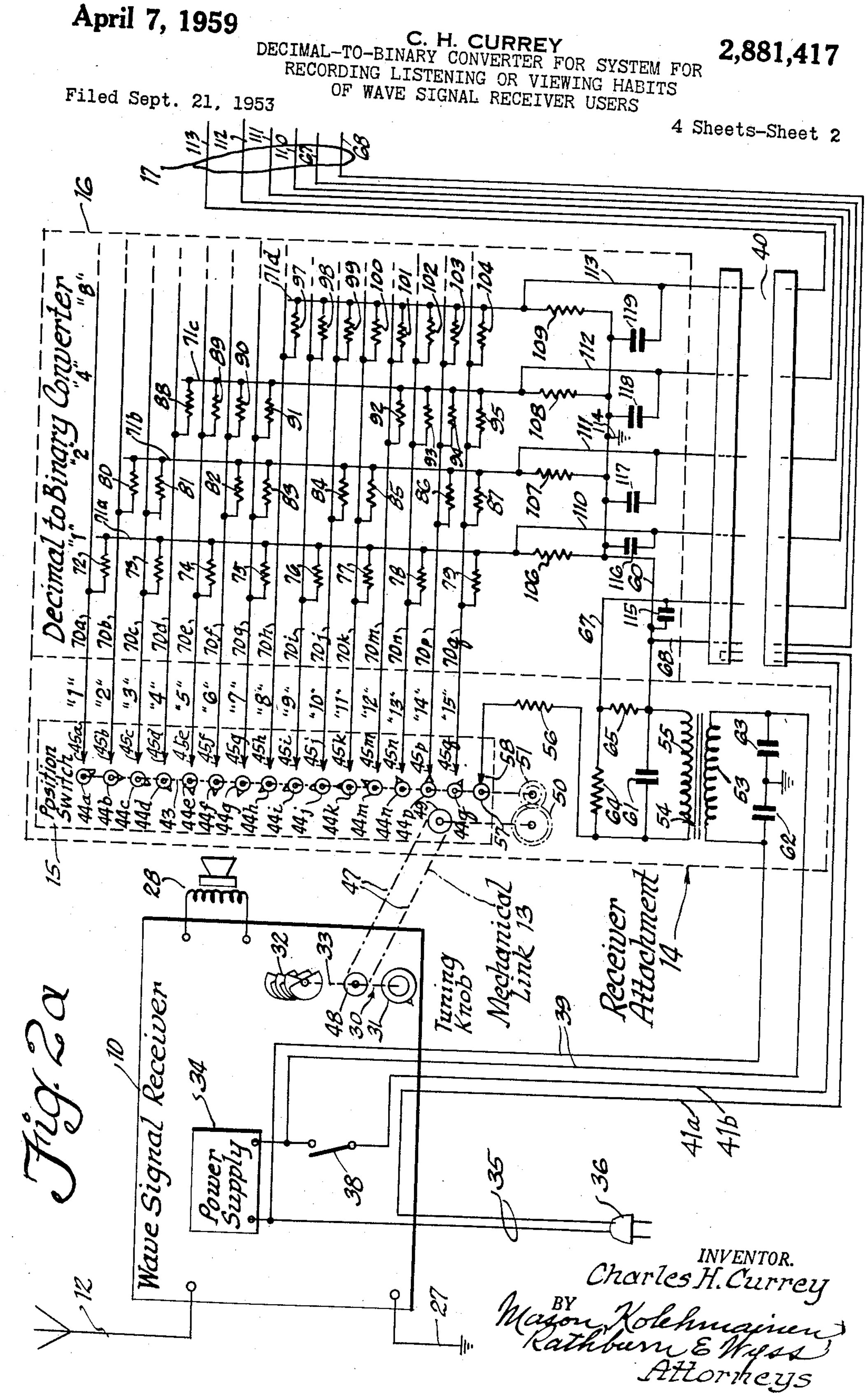
Figure 2B:
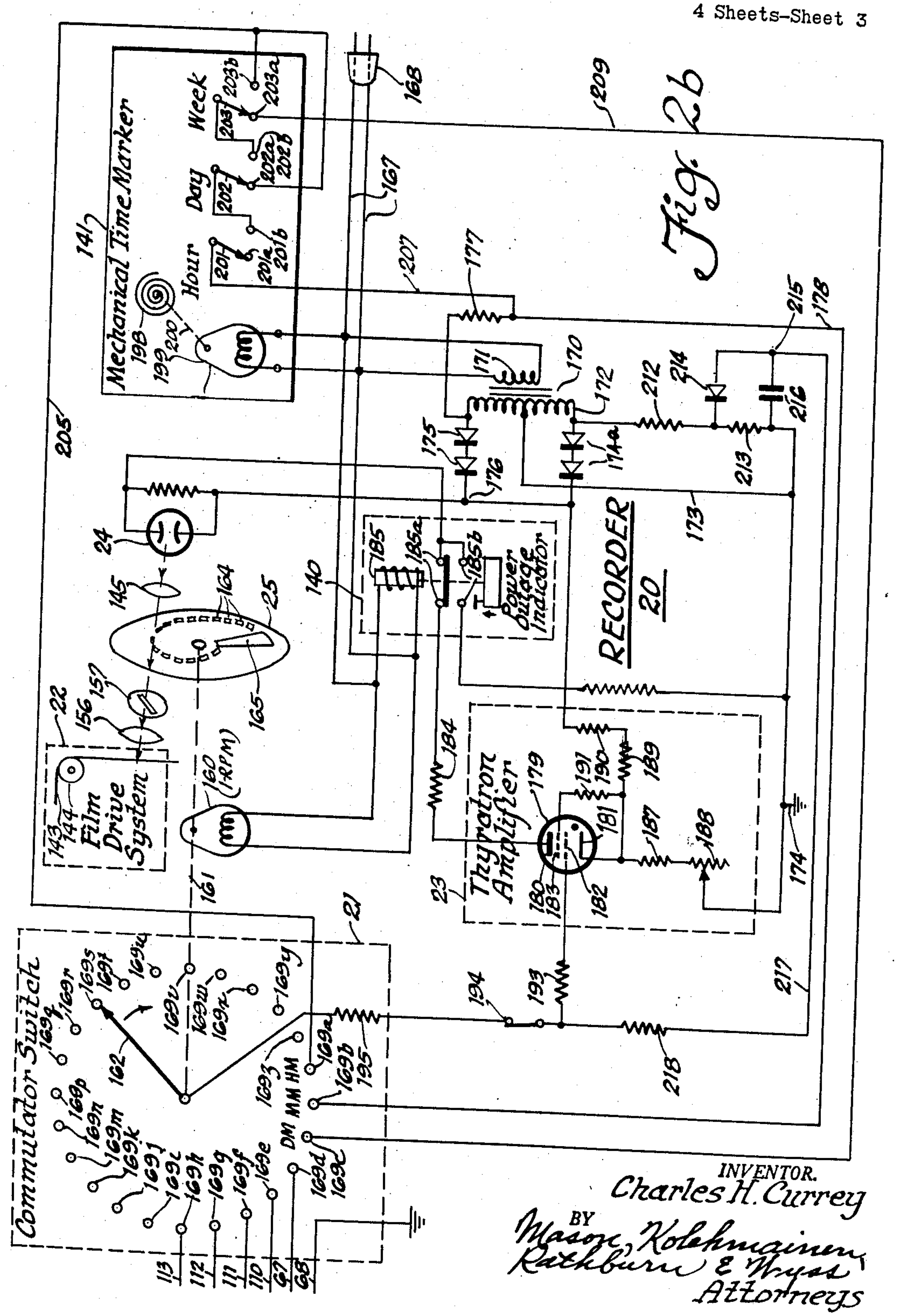
Figure 3A:
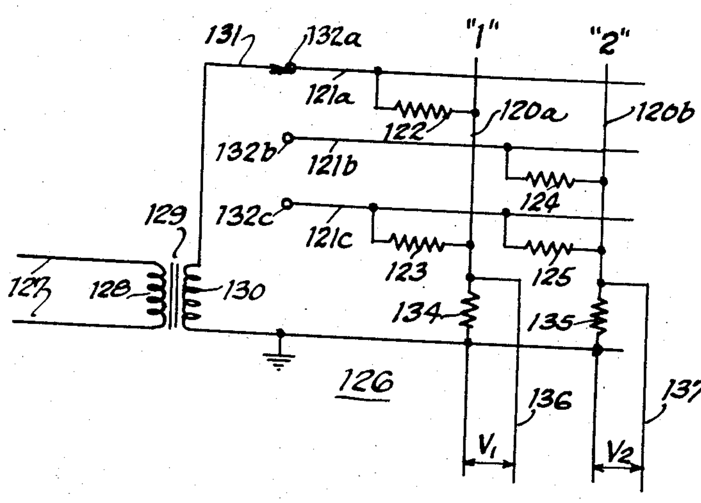
Figure 3B:
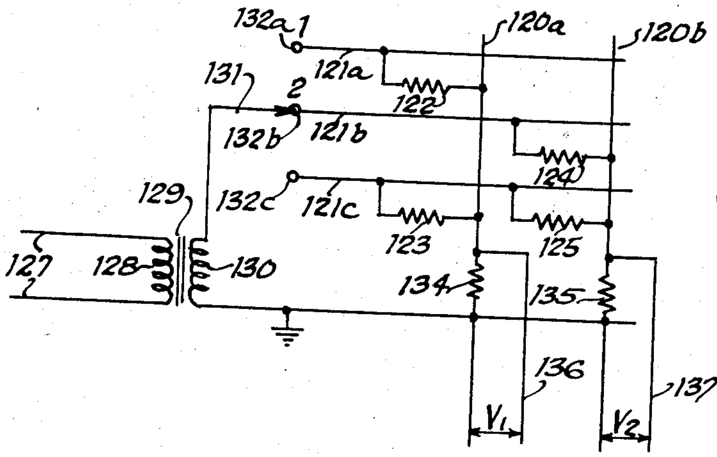
Figure 3C:
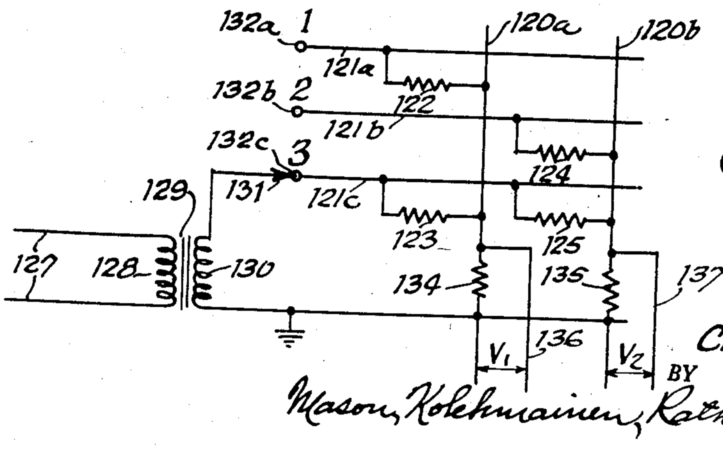

For a better understanding of the present invention reference may be had to the accompanying drawings in which:

Fig. 1 is a schematic diagram of a system for recording the listening and viewing habits in a multireceiver home embodying the present invention;

Figs. 2*a* and 2*b* together are a schematic representation showing in greater detail portions of the system of Fig. 1 to illustrate the present invention; and Figs. 3*a*, 3*b* and 3*c* are schematic diagrams to aid in better understanding the present invention.

It will be understood from the following description that certain features of the present invention are applicable to certain general applications, but they are particularly applicable to systems and apparatus for determining the listening or viewing habits of a radio or television receiver audience. For the purpose of fully disclosing the present invention, it has been illustrated as applied to a particular type of system, and, moreover, to a system where a plurality of receivers are located in a single home, all of which receivers must be monitored. The present invention is at its best in the latter situation, and hence this application is specifically considered, although, obviously, the invention may be usable in other systems.

Referring now to Fig. 1 of the drawings, there is illustrated a system embodying the present invention for recording the tuning conditions of a plurality of wave signal receivers which are assumed to be located in a single home, although it will be appreciated that they could be located in several adjacent homes. These wave signal receivers are designated by the reference numerals 10 and 11 in Fig. 1. Obviously, numerous additional wave signal receivers would be included if additional receivers were included in a particular home where the listening or viewing habits are to be determined. The wave signal receivers 10 and 11 are schematically illustrated in block diagram, each being provided with the conventional antenna 12, the receivers being provided with the usual means for tuning them to receive the radiated carriers from a plurality of transmitters within the reception range of the receivers. The wave signal receivers may be radio receivers, television receivers, FM receivers, or a combination of one or more of these types of receivers. Heretofore, surveys have generally been interested in radio listening, including AM and FM or television listening, and generally separate surveys of radio and television listening are made. However, there is no reason, as far as the present invention is concerned, why a record of the tuning condition of a plurality of receivers regardless of type cannot be made on a single record receiving element.

As illustrated, each wave signal receiver such as 10 and 11 is connected by a suitable mechanical link such as 13 with a receiver attachment designated as 14. Since these receiver attachments are identical, the same reference numeral is applied to each. Each receiver attachment comprises a position switch indicated in Fig. 1 by block diagram and designated by the reference numeral 15. The receiver attachment also includes the decimal-to-binary converter of the present invention designated by the reference numeral 16. It will be appreciated that each receiver attachment 14 will be closely associated with a particular wave signal receiver such as 10 and 11 in view of the fact that the mechanical link 13 should be relatively short. As a matter of fact, this mechanical link may comprise a flexible cable, a belt and pulley arrangement or the like, and hench each receiver attachment is preferably closely associated with its wave signal receiver. Moreover, the receiver attachment is a relatively small device which can be disposed within many receiver cabinets whereby the collaborator will not even be aware of its presence.

For the purpose of recording information of the channels to which the wave signal receivers 10 and 11 are tuned on a single record element, the receiver attachments 14 are each connected by a suitable cable 17 with a recorder generally indicated at 20. This recorder is schematically indicated in Fig. 1, and in certain respects is substantially identical with the recorder disclosed and claimed in the above-mentioned copending Krahulec application. This recorder includes, among other things, a commutator switch 21, a film drive system 22, a thyratron amplifier 23 controlling a signal lamp 24 associated with the film drive system 22, which signal lamp has the light thereof controlled by a shutter disk 25. In any event, the tuning conditions of the wave signal receivers 10 and 11 and any others that are to be logged in a particular home are represented by electrical signals produced by means including the position switches 15. Moreover, by means of the decimal-to-binary converter 16, decimal representations of these electrical signals are converted to binary representations which are suitably recorded at the recorder 20. It should be understood that the recorder 20 of the present invention is preferably like that in the above-mentioned Krahulec application, including a suitable mailable magazine into which the recorded information is gathered. Since the recorded information from several receivers appears on a single record in a single mailable magazine, no problem of the collaborator making a mistake can arise, since the analysis organization will only send him a single magazine. No disclosure of the mailable magazine is made in this application, since this is fully disclosed in prior applications, and whether or not a mailable magazine is included is unimportant as far as the present invention is concerned, except that it solves a problem which was created by virtue of the use of such mailable magazines.

Referring now to Figs. 2*a* and 2*b* of the drawings, which together show in more detail the system shown primarily by block diagrams in Fig. 1 of the drawings, it will be noted that the same reference numerals are employed to designate the corresponding parts. In Fig. 2*a* there is disclosed the wave signal receiver 10, which may be any type of receiver whether it be for amplitude modulated or frequency modulated program signals, or both, or whether the signals are eventually converted to visible or audible form, or both. As illustrated in Fig. 2*a*, the wave signal receiver 10 is schematically indicated as comprising an antenna 12 and a ground circuit 27. Additionally, it is illustrated as including a signal reproducer 28, which has been schematically illustrated as a loud speaker, although, obviously, it might equally well comprise a fluorescent screen or similar apparatus. Interposed between the antenna ground circuit comprising the antenna 12 and the ground connection 27, and the signal reproducer 28, are of course included the usual stages of a wave signal receiver which are not shown but which might comprise a tunable radio frequency amplifier, a mixer or modulator, and in the case of a conventional radio receiver an audio-frequency amplifier and the like.

Since the wave signal receiver 10 is representative of any conventional receiver whether it be a radio receiver or a television receiver, its mode of operation will be readily apparent to those skilled in the art, and, consequently, no further discussion thereof is included in this application.

Wave signal receivers generally include some form of tuning apparatus, and for wave signal receiver 10 this is schematically designated by the reference numeral 30 in Fig. 2*a* of the drawings, comprising a tuning knob 31 and a resonant frequency varying device 32 drivingly interconnected by a tuning shaft 33. The wave signal receiver 10 also includes a power supply unit schematically designated by the reference numeral 34, which power supply unit is suitably connected to a power outlet through the conventional power cord 35 having at the end thereof the ordinary plug connector 36. The energization of the wave signal receiver 10 is conventionally controlled by set switch or "on" "off" switch 38. In conventional receivers this switch is usually combined with the manual volume control means.

For the purpose of supplying power to the receiver attachment 14 there are included a pair of power supply conductors 39 leading from the power supply unit 34 of the receiver 10 to the receiver attachment 14. In order to make sure that the recorder 20 is connected to the receiver 10 so that all use of the receiver is recorded at all times one lead of the power cord 35 is completed only if a plug connector 40 connects the recorder 20 with the receiver attachment 14. This connector 40 is illustrated as a multiprong connector, two prongs of which interconnect the conductors **41*a* and 41*b* to complete the power circuit to the power supply unit 34 of the receiver 10. This is a feature to insure that the receiver attachment 14 is electrically connected to the recorder 20 before the receiver 10** can be operated. It will be apparent that with the arrangement shown in Fig. 2*a* no current can flow in the conductors 39 when the connector 40 is disconnected, even through set switch 38 is closed.

It will be understood by those skilled in the art that there must be obtained from the wave signal receiver 10 or any receiver being monitored a response of some sort indicative of the tuning condition of the receiver. This response might be an electrical response or a mechanical response. It will be appreciated that if the receiver 10 being monitored is a superheterodyne receiver, the output of the local oscillator will vary in frequency with changes in tuning so as to be indicative of the tuning condition of the receiver. This might be termed an "electrical response." Also, the physical position of the resonant frequency varying means 32 is clearly indicative of the tuning condition of the receiver, and such variation of the tuning shaft position might be termed a "mechanical response" indicative of the tuning condition of the receiver similar to the "electrical response" obtained when the frequency of a local oscillator is measured. With the present invention obviously either form of response may be employed, but for purposes of illustrating the invention, an arrangement utilizing the "mechanical response" is shown in the drawings.

Thus, in order to convert the tuning position of the tuning shaft 33 of the receiver 10 to a readily transmittable indication such as an electrical signal, there is provided in the receiver attachment 14 the position switch 15. This position switch may be of the form disclosed and claimed in U.S. Patent 2,658,963. Essentially, the position switch 15 comprises a rotary conducting shaft 43 to which are attached a plurality of regularly spaced cams **44*a*, 44*b*, 44*c*, 44*d*, 44*e*, 44*f*, 44*g*, 44*h*, 44*i*, 44*j*, 44*k*, 44*m* 44*n*, 44*p*, and 44*q*. As illustrated, there are fifteen cams 44. Each of these cams 44 includes an identical raised portion for making electrical contact with an associated contact 45, designated by the same subscript as the cams 44. Thus, the cam 44*a*, at a predetermined point in rotation thereof, will engage its associated contact 45*a*. Similarly, the cam 44*b* at a predetermined point in its rotation will contact its associated contact 45*b*, and so on with the remainder of the cams 44 and the associated contacts 45**.

Preferably, the cams 44 are adjustable relative to the shaft 43 so as to engage their associated contacts 45 in any desired predetermined sequence. Likewise, the position switch 15 preferably includes the features disclosed and broadly claimed in Rahmel Patent No. 2,484,734, whereby each cam 44 will engage its associated contact 45 over the entire position of the tuning shaft 33 that a particular transmitting station can be tuned in. It will be understood that the angular extent over which this can occur will vary, depending upon the particular station involved, as is fully disclosed in the above-mentioned Rahmel patent. Although there have been disclosed fifteen cams 44, all connected to the same conducting shaft 43, which would be capable of giving indication to fifteen separate tuning channels, it will readily be appreciated that more or less cams could be employed, and, as a matter of fact, some of the cams might be used to indicate tuning to a frequency modulation band, while others might be used to indicate tuning to an amplitude modulation band. It has been found that fifteen cams are entirely adequate to cover the ordinary listening to which a particular radio receiver is subjected, since there usually are not that many stations that can be received satisfactorily or at least that are commonly tuned in. In the case of television receivers, there are presently only a maximum of seven channels available to any one receiver. It will be understood that the fifteen channels provided by the position switch are representative only and permit illustrating the decimal-to-binary converter of the present invention for converting the fifteen decimal representations to a relatively few binary representations. It will be obvious that the cams 44 will be positioned on the conducting shaft 43 so that the associated contacts 45 are sequentially engaged as the tuning shaft 33 is caused to scan the frequency spectrum of receiver 10.

In order that the position of the shaft 43 of the position switch 15 may be correlated with the position of the tuning shaft 33, there is provided a suitable mechanical link which has heretofore been generally designated by the reference numeral 13 and which has been specifically illustrated as a pair of Bowden wires 47, the ends of which are preferably wrapped around the respective shafts 33 and 43, or around suitable pulleys such as 48 and 49 associated with such shafts. As illustrated, the pulley 48 is mounted on the shaft 33, while the pulley 49 is drivingly connected to the position switch shaft 43 through a pair of gear members 50 and 51. It will be apparent from the above description that the cams 44 may be individually adjusted so as to complete an electrical circuit with an associated contact 45 whenever the tuning shaft 33 is tuned to a particular transmitting station, of which the particular cam 44 is representative.

As was pointed out above, power is supplied to the receiver attachment 14 through conductors 39, and this is accomplished whenever the set switch 38 is closed, and, of course, assuming that the connector 40 is in its connected position. The conductors 39 are connected to the primary winding 53 of a step-up transformer 54 having a secondary winding 55. The transformer 54 in a particular arrangement embodying the present invention was a step-up transformer that stepped up the ordinary 60-cycle voltage found in the ordinary household to 255 volts, which voltage was found desirable as the supply voltage for the decimal-to-binary converter 16 described in detail hereinafter. This transformer 54 serves as an isolating transformer for isolating the power line 35 from the remainder of the receiver attachment and recording equipment, particularly the cable 17, thus eliminating any shock hazard. This transformer is designed so that even with a dead short circuit across the same no fire hazard is involved. One terminal of the secondary winding 55 is illustrated as being connected to the position switch conducting shaft 43 through a noise suppression resistor 56 and a collector ring 57, which continuously engages a suitable brushlike member 58. The other terminal of the secondary winding 55 is connected through a conductor 60 with the decimal-to-binary converter 16 described hereinafter. As will be apparent as the description of this system proceeds, the voltage on the conductor 60 serves as a reference level and is connected through the conductor 68 to the connector 40. Suitable noise suppression capacitors 61, 62 and 63 are also associated with the transformer 54 in a conventional manner.

In order to produce a recordable indication whenever the receiver 10 is turned on, there is provided a voltage divider comprising resistance elements 64 and 65 connected across the secondary winding 55 of the transformer 54. A potential is supplied from this voltage divider to a conductor 67, which with the conductor 68 connected to the conductor 60 is included in the cable 17 leading to the recorder 20 and described in greater detail hereinafter. The conductor 67 connected to the voltage divider described above provides a radio "on" or wave signal receiver "on" indication at the recorder at all times when the wave signal receiver is turned on, even though the receiver may not be tuned to a station for which one of the cams 44 is provided.

The decimal-to-binary converter 16 has been specifically illustrated in Fig. 2*a* as one for converting a decimal fifteen representation to a binary four representation. It will be understood from the ensuing description that the binary four arrangement and the decimal fifteen arrangement are by way of example for illustrating the present invention and not by way of limitation. Broadly the decimal-to-binary converter described herein includes fifteen separate conductors on the input side representing the decimal side and four conductors on the output side which represent the binary side. The application of a voltage to any one of the fifteen input conductors causes a unique combination of potentials on the four output conductors. The voltages on the output conductors are taken in two groups: those designated "undesired" which are below some maximum value and those designated "desired" which are at least three times greater than said maximum value. There are fifteen different combinations or permutations of desired and undesired voltages. Thus, if a potential is applied to any one of the fifteen input conductors there is a unique combination of voltages at the output to identify which input conductor was so energized.

The means for obtaining these unique combinations is as follows: arrange an orderly system of fifteen different combinations of desired and undesired potentials on the four output conductors. Identify each such combination with a specific input conductor. Take each input conductor one at a time and connect a resistor R between that input conductor and any of the output conductors which are to have a desired voltage. Between each output conductor and ground or common connect resistors "*r*" having a value of $R/10$. It will be noticed that a desired voltage is obtained on an output conductor when a resistor R is connected directly between that conductor and the energized input conductor and that an undesired voltage is obtained at the output conductor by reason of the fact that there are only indirect paths between the output conductor with an undesired voltage and the energized input conductor, said paths comprising several resistors R in a series-parallel combination.

Referring specifically to Fig. 2*a* of the drawings, the decimal-to-binary converter comprises a grid of fifteen input conductors 70 specifically designated as 70*a*, 70*b*, 70*c*, 70*d*, 70*e*, 70*f*, 70*g*, 70*h*, 70*i*, 70*j*, 70*k*, 70*m*, 70*n*, 70*p* and 70*q*. These decimal digit conductors 70 are illustrated in Fig. 2*a* of the drawings as the conductors defining the horizontal portion of the grid, and bearing code numbers "1," "2," "3," "4," "5," "6," "7," "8," "9," "10," "11," "12," "13," "14" and "15," respectively. In addition to that, there are the binary digit or output conductors 71, specifically designated as 71*a*, 71*b*, 71*c* and 71*d*, which have been illustrated as the vertical conductors of the grid, there being four of them in view of the binary four output. The conductor 71*a* bears Code No. "1," conductor 71*b* bears Code No. "2," conductor 71*c* bears Code No. "4," while conductor 71*d* bears Code No. "8." It will readily be apparent that by appropriately grouping these code numbers their sums will produce any number from 1 to 15. It will, thus, be apparent that if an appropriate output voltage is obtained across various combinations of the binary digit conductors 71, a code unique to fifteen stations can be obtained from the four conductors. Set forth below is a tabulation of fifteen decimal numbers representative of fifteen stations, and the code number or numbers of the conductors 71 which must be energized so that the sum of these code numbers is equal to the decimal number.

| Station number or decimal number | Code numbers of conductors 71 to be simultaneously energized so that the sum of the code numbers equals station number | Specific conductors 71 which must be energized |
|---|---|---|
| 1 | 1 | 71*a*. |
| 2 | 2 | 71*b*. |
| 3 | 1 and 2 | 71*a* and 71*b*. |
| 4 | 4 | 71*c*. |
| 5 | 4 and 1 | 71*c* and 71*a*. |
| 6 | 4 and 2 | 71*c* and 71*b*. |
| 7 | 4, 2 and 1 | 71*c*, 71*b* and 71*a*. |
| 8 | 8 | 71*d*. |
| 9 | 8 and 1 | 71*d* and 71*a*. |
| 10 | 8 and 2 | 71*d* and 71*b*. |
| 11 | 8, 2 and 1 | 71*d*, 71*b* and 71*a*. |
| 12 | 8 and 4 | 71*d* and 71*c*. |
| 13 | 8, 4 and 1 | 71*d*, 71*c* and 71*a*. |
| 14 | 8, 4 and 2 | 71*d*, 71*c* and 71*b*. |
| 15 | 8, 4, 2 and 1 | 71*d*, 71*c*, 71*b* and 71*a*. |

In accordance with the present invention, a plurality of passive linear impedance elements such as resistance elements interconnect the fifteen decimal digit conductors 70 and the four binary digit conductors 71. As illustrated, alternate ones of the conductors 70 are connected to the conductors 71 through a plurality of resistors, 72, 73, 74, 75, 76, 77, 78 and 79. Thus, conductor 70*a* is connected to conductor 71*a* through resistor 72. Conductor 70*c* is connected to conductor 70*a* through resistor 73. Conductor 70*e* is connected to conductor 70*a* through resistor 74, etc. For a particular application, the resistors 73, 74, 75, 76, 77, 78 and 79 had a resistance of 680,000 ohms, while the resistor 72 had a resistance of 470,000 ohms. All resistances could have been of the same magnitude, namely 680,000 ohms, but a greater spread between desired and undesired voltages could be obtained if the resistor 72 connecting conductors 70*a* and 71*a* had a somewhat lower resistance. Also in accordance with the present invention, the binary digit conductor 71*b*, bearing Code No. "2," is connected to various ones of the demical digit conductor 70 in groups of two through a plurality of resistors 80, 81, 82, 83, 84, 85, 86 and 87. For this arrangement the first conductor 70*a* is not connected to conductor 71*b*, but the next two conductors 70*b* and 70*c* are connected to the binary digit conductor 71*b* through resistors 80 and 81. Decimal digit conductors 70*d* and 70*e* are not connected to binary digit conductor 70*b*. However, the next two conductors 70*f* and 70*g* are connected thereto through resistances 82 and 83, respectively.

In view of what has gone before, it will be apparent that binary digit conductor 71*c*, which bears Code No. "4," will be connected to the conductor 70 in groups of four. The first three conductors 70*a*, 70*b* and 70*c* are not connected to conductor 71*c*. However, the next group of four conductors 70*d*, 70*e*, 70*f* and 70*g* are connected through resistors 88, 89, 90 and 91, respectively, with binary digit conductor 71*c*. The next group of four decimal digit conductors 70*h*, 70*i*, 70*j*, and 70*k* are not connected to binary digit conductor 71*c*. However, the next group of four decimal digit conductors 70*m*, 70*n*, 70*p* and 70*q* are connected through resistors 92, 93, 94 and 95, respectively, to the binary digit conductor 71*c*. Since binary digit conductor 71*d* bears Code No. "8," it is connected to the decimal digit conductor 70 in groups of eight. To this end, the first seven decimal digit conductors 70*a*, 70*b*, 70*c*, 70*d*, 70*e*, 70*f*, and 70*g* are not connected to binary digit conductor 71*d*, while the remaining eight decimal digit conductors 70*h*, 70*i*, 70*j*, 70*k*, 70*m*, 70*n*, 70*p* and 70*q* are connected through resistors 97, 98, 99, 100, 101, 102, 103 and 104, respectively with the binary digit conductor 71*d*. All of the resistors 81 to 87, inclusive, connected to binary digit conductor 71*b* for a particular application had a resistance value of 680,000 ohms, while the resistor 80 interconnecting conductors 70*b* and 71*b* had a resistance of 470,000 ohms to obtain a greater spread between desired and undesired voltages. Likewise, for this same application, all of the resistors 89 to 95, inclusive, connected to the binary digit conductor 71*c* had a resistance of 680,000 ohms, while the resistor 88 interconnecting conductors 70*d* and 71*c* to obtain a greater voltage spread had a resistance of 470,000 ohms. Likewise, also, all of the resistors 98 to 104, inclusive, connected to the binary digit conductor 71*d* had a resistance of 680,000 ohms, while the resistor 97 connected thereto had a resistance of 470,000 ohms. All of these resistors described thus far are the ones designated R above.

From the above description it will be apparent that the decimal-to-binary converter 16 comprises passive linear impedance elements, and no movable parts are included therein. It should be understood that the present invention is not restricted to the use of resistors, as illustrated, since capacitors would also be applicable. They would maintain the same high impedance level and would actually provide greater precision, if required, than carbon resistors. They would, moreover, require only slightly more volume to contain the same. The capacitive reactance magnitudes would be chosen in a manner to provide the desired-to-undesired signal ratio and voltage level, as will be described in greater detail in connection with the passive resistance elements described in connection with the Fig. 3*a*, Fig. 3*b* and Fig. 3*c* embodiments. Actually, also, inductive reactances could be used in place of the resistors, but problems would arise from the inductive coupling between the inductors, and a much greater volume would be required to contain the arrangement.

In order to complete the energization circuit of the grid comprising the conductors 70 and 71, the terminal of the secondary winding 55 of the transformer 54 connected to the conductor 60 is connected to each of the binary digit conductors 71 in parallel through suitable resistors 106, 107, 108 and 109 which can be termed the "*r*" resistors having about one-tenth the resistance of the R resistors. As illustrated, the resistor 106 is interposed between the conductor 60 and conductor 71*a*, the resistor 107 is interposed between conductors 60 and 71*b*, the resistor 108 is interposed between conductors 60 and 71*c*, and the resistor 109 is interposed between conductors 60 and 71*d*. Preferably, this conductor 60 is grounded as indicated at 114. Thus, one terminal of all the resistors 106, 107, 108 and 109 is grounded, and the other terminal of these resistors effectively supplies the output potential of the decimal-to-binary converter 16. Accordingly, these output terminals of the resistors 106 to 109, inclusive, are connected to the recorder 20 by suitable conductors included in the cable 17. As illustrated, the output terminal of the resistor 106 is connected to a conductor 110. The output terminal of the resistor 107 is connected to a conductor 111. The output terminal of the resistor 108 is connected to conductor 112, and the output terminal of the resistor 109 is connected to a conductor 113. It will be apparent that whenever one of the cams 44 engages its associated contact 45, an output voltage will appear across some or all of the resistors 106 to 109, inclusive, assuming, of course, that the transformer 54 is energized. As will become apparent from the following description, some of the voltages across the resistors will be higher than others, and some of the voltages are considered undesired voltages. It would be desirable to provide zero output across those resistors which are not to have a potential across them for a particular code situation, but, as a practical matter, this is not obtainable. However, the ratio of the desired-to-undesired voltages can be sufficiently high so that, effectively, the undesired voltage is no different than a zero voltage.

In the event that a higher separation between desired and undesired voltage levels is required the ratio of resistors R from the decimal-to-binary conductor to the resistors "*r*" from the binary conductors to ground may be increased with a proportionate increase in supply voltage to make the desired output the same. This may also be accomplished by amplification of the output voltage. Above a ratio of about 10 for the resistors, the desired-to-undesired ratio becomes almost linear with resistor ratio.

In order to extend the system to any general number of binary digit output, let $n$=number of binary digits, then $(2^n-1)$ equals the corresponding number of decimal digits (D) which may be represented in binary form. For example, with 2 binary digits ($n=2$), $2^2-1=3$, the number of decimal digits, and so forth as follows:

| Binary digits ($n$) | Decimal digits (D) |
|---|---|
| 1 | 1. |
| 2 | 3. |
| 3 | 7. |
| 4 | 15, |
| 5 | 31. |
| 6 | 63. |
| 7 | 127. |
| Etc. | Etc. |

Actually, if one were interested in employing the absence of any output signal as an indication, the decimal digits D in the above table could be increased by one in each case. In the illustrated application, however, it is desired to use the absence of any output when the receiver 10 is turned on as an indication of tuning to a channel not provided for in the recorder 20.

To eliminate any undesirable noise and to act as noise suppressors, suitable capacitors 115, 116, 117, 118 and 119 are included in the decimal-to-binary converter 16. These capacitors are connected between ground and the output conductors 67, 110, 111, 112 and 113, respectively.

The functioning of the decimal-to-binary converter can best be understood by referring to Figs. 3*a*, 3*b* and 3*c* of the drawings, in which there is illustrated a decimal three representation convertible to a binary two representation. The corresponding parts of Figs. 3*a*, 3*b* and 3*c* are designated by identical reference numerals. Referring to Fig. 3, there is illustrated a decimal-to-binary converter in which binary digit conductors 120*a* and 120*b* are provided, illustrated as the vertical conductors of the grid and bearing Code Nos. "1" and "2," respectively. The decimal digit conductors 121 are designated specifically as 121*a*, 121*b* and 121*c*. As in the Fig. 2*a* arrangement, the binary digit conductor 120*a* is connected to every other one of the decimal digit conductors 121 through suitable resistors specifically designated as 122 and 123. As illustrated, conductor 121*a* is connected to conductor 120*a* through resistor 122. Similarly, conductor 121*c* is connected to conductor 120*a* through resistor 123. However, conductor 121*b* is not connected to conductor 120*a*. Since binary digit conductor 120*b* bears Code No. "2," it is connected to conductors 121 in groups of two. Thus, conductors 121*b* and 121*c* are connected to conductor 120*b* through resistors 124 and 125, respectively. Conductor 121*a* is not connected to conductor 120*b*.

For the purpose of supplying power to the decimal-to-binary converter 126 shown in Figs. 3*a*, 3*b* and 3*c* of the drawings, there is provided a source of potential 127 connected to the primary winding 128 of the transformer 129 having a secondary winding 130. One terminal of the secondary winding 130 is connected to a movable switch member 131, and successive terminals are selectively engageable with contacts 132*a*, 132*b* and 132*c*, respectively connected to the corresponding one of the conductors 121 bearing the same subscript. The one terminal of the secondary winding 130 is illustrated as the grounded terminal which is connected to the binary digit conductors 120*a* and 120*b* through resistors 134 and 135, respectively. The output terminals of the resistors 134 and 135 are connected to output conductors 136 and 137, respectively. Upon energization of transformer 129, various voltages with respect to ground will appear at terminals 136 and 137. These voltages have been indicated as $V_1$ and $V_2$, respectively.

For simplifying and understanding the present invention, let it be assumed that the voltage across the secondary winding 130 is one hundred ten volts, and that the resistors 122, 123, 124 and 125 are ten ohm resistors. Also, let it be assumed that the resistors 134 and 135 are one ohm resistors. Fig. 3*a* shows the arrangement where the switching element 131 is in a position for station one, which is decimal digit one; Fig. 3*b* shows the arrangement where station two is effective as far as the decimal digit is concerned; and Fig. 3*c* shows the arrangement where the decimal digit three is effective. For the particular circuit parameters mentioned above, the output voltage at terminal 136 of Fig. 3*a* will be nine and one-half volts, while the output voltage $V_2$ at terminal 137 is five-tenths of a volt. From the table set forth above it will be apparent that a binary signal for station one should appear on conductor 1. Since the ratio of the desired signal at conductor 136 to the undesired voltage appearing at conductor 137 is nineteen, it will be obvious that no problem of rendering the undesired voltage ineffective arises. The voltage outputs can readily be calculated by using the fundamental laws relating to impedance networks. By the same arrangement, the voltage outputs $V_1$ and $V_2$ in Fig. 3*b* will be one-half volt and nine and one-half volts, respectively, or, in other words, the reverse of Fig. 1, so that the binary representation will occur effectively only at the output of conductor 120*b*.

To produce the code number three by the binary representation, it is desirable for station three to have effective output voltages at both conductors 120*a* and 120*b*, and it can readily be shown for the configuration of Fig. 3*c* that output voltages $V_1$ and $V_2$ will both be ten volts, and the desired decimal number equal to the sum of the code numbers is, therefore obtained.

It should be understood that the same explanation can be made for the decimal-to-binary converter 16 which converts a fifteen decimal representation to a binary four representation, but the much simpler arrangement shown in Figs. 3*a*, 3*b* and 3*c* permits a simple explanation thereof. Although for the arrangements described an alternating current voltage has been indicated as the supply source, the present invention is equally applicable where a direct current voltage source is employed. It will be appreciated as mentioned above that the decimal-to-binary converter of the present invention is usable with digit capacities other than decimal fifteen to binary four, or decimal three to binary two. As the capacity of the converter is raised, the spread between desired and undesired potentials decreases, assuming no change in ratio between resistors R and "*r*." For the arrangement shown in Fig. 2*a*, using the parameters mentioned above, the following may be tabulated:

| Number of binary busses energized | Decimal code numbers | Ratio of desired voltage to supply voltage | Desired volts output | Ratio of undesired voltage to supply voltage | Undesired volts output |
|---|---|---|---|---|---|
| 1 | 1,2,4,8 | .0732<br>(.0517) | 18.6<br>(13.1) | .0065<br>(.00461) | 1.65<br>(1.18) |
| 2 | 3,5,6,9,10,12 | .0562 | 14.3 | .0092 | 2.24 |
| 3 | 7,11,13,14 | .0603 | 15.4 | .0137 | 3.50 |
| 4 | 15 | .0647 | 16.5 | ---------- | ---------- |

The data in parentheses is that obtained if all resistors R were the same namely 680,000 ohms. Thus is indicated why the resistors 72, 80, 88 and 97 were chosen to have a resistance of 470,000 ohms.

From the above table it will be apparent that the output voltage of the decimal-to-binary converter 16 is in the neighborhood of fifteen or sixteen volts, and it will be apparent that this low voltage can be carried in a low voltage conductor cable as 17 having only a very few conductors, actually six in number. This cable can be run along the baseboard of the home or concealed, if desired, without presenting any fire or shock hazard. As a matter of fact, the design has proven that even upon shorting the terminals of transformer 54 no high currents causing any fire hazard will occur.

For the purpose of recording in binary code the output of the decimal-to-binary converter, the recorder 20, generally designated by block diagram in Fig. 1, is provided. This recorder 20 comprises everything shown in Fig. 2*b* of the drawings and is also designated by the reference numeral 20. Basically, this recorder includes a number of elements fully disclosed in the above-mentioned Krahulec application, Serial No. 147,302. As illustrated, this recorder comprises the commutator switch 21, the film drive system 22, the thyratron amplifier 23, the signal lamp 24, a shutter disk 25, a power outage indicator 140, a mechanical time marker 141, and associated control means. As is fully disclosed in the above-mentioned Krahulec application, the medium upon which the record is produced comprises photographic film, a small portion of which is shown in the film drive system 22 of Fig. 2*b* and designated by the reference numeral 143. It should be appreciated that as far as the present invention is concerned, the recording medium 143 need not be photographic film. However, photographic film does lend itself well to high speed decoding and has numerous other advantages, so that for the purpose of illustrating the present invention a film type record tape 143 is assumed which is movable over a suitable guide pulley 144. It will be appreciated that the signal light 24 is provided to expose selected portions of the film 143, and suitable lenses 145 and 146, a target 157 and a shutter disk 25 are interposed in the light path between the light source 24 and the film 143. To insure long life, the signal light or lamp 24 is preferably an argon lamp, in which case it would be connected in series with a suitable current limiting resistor. This lamp 24, as will become apparent from the ensuing description, must be connected across a suitable power circuit and controlled by the commutator switch 21 in order to produce the desired control thereof. When the light is energized, it will produce a record indication on the film 143. By employing the decimal-to-binary converter of the present invention described above, which has a relatively low output voltage, the voltage is insufficient to energize the lamp 24. Therefore, the thyratron amplifier unit 23 is provided to insure that the low voltage output from the decimal-to-binary converter 16 can properly energize the lamp 24 at the appropriate times. The lamp 24 will be energized at least once per minute and sometimes several times per minute, and to avoid any radio interference suitable filter means and noise suppressor circuits are provided which include the capacitor and resistance elements already described.

For the purpose of causing the lamp 24 to expose certain portions of the film 143 in a predetermined manner so that binary code indications are produced in correct positions across the record receiving element 143, it is necessary to expose predetermined transverse portions of the film 143 in synchronism with the energization of the light source 24. The optical system already described, including the light source 24, is, therefore, provided, of which the shutter disk 25 is a very important element.

To properly correlate the shutter disk 25, which is a rotatable element, with the commutator switch 21, the two are preferably driven at one revolution per minute by a suitable motor 160, which is illustrated as being directly connected by a common shaft 161 with the rotating arm 162 of the commutator switch 21 and the shutter disk 25. In order to cause light from the source 24 to fall on different predetermined positions transversely of the film 143 in dependence upon the pulses produced by the commutator switch 21, the rotating shutter disk 25 is provided with a plurality of elongated slits or openings 164. These slits 164 are arranged in a spiral around the disk thereby to cause the light to move successively across the film 143. Thus, the slits are successively presented to the light source 24 so that the film is exposed transversely beginning with one side and moving to the other. Preferably, suitable means are provided to move the film 143 the width of one of the slits in the shutter disk during the time that the disk rotates through one revolution, so that the record will always be produced on an unexposed portion of the film. The shutter disk 25 is also provided with one large opening 165 to permit the field man to view the entire film. Actually, and as described hereinafter, the lamp 24 is constantly energized for a predetermined period of time, such as several minutes after power is restored following a power outage. Thus, the openings 164 will expose the entire film area immediately following a power outage, thus giving a clear record indication that a power outage has occurred. In initially adjusting the optical system of the recorder of the present invention, the commutator switch 21 would be adjusted so that a particular contact thereof was energized or at least was engaged by rotating contact arm 162 when a particular slit 164 of the shutter disk 25 was effective to transmit light from lamp 24 to film 143.

In order that the one revolution per minute motor 160 may be continually energized so long as there is no power outage, the central station is provided with a source of power, not shown, to which may be connected the conductors 167 by the conventional plug connecter 168. The conductors 167 are connected directly to the terminals of the motor 160.

The commutator switch of the present invention is illustrated as a very simple type of switch having a rotating switch arm 162 capable of successively engaging a plurality of contacts 169, and specifically designated as **169*a*, 169*b*, 169*c*, 169*d*, 169*e*, 169*f*, 169*g*, 169*h*, 169*i*, 169*j*, 169*k*, 169*m*, 169*n*, 169*p*, 169*q*, 169*r*, 169*s*, 169*t*, 169*u*, 169*v*, 169*w*, 169*x*, 169*y* and 169*z*. Actually twenty-four contacts are illustrated, although a greater or a lesser number can readily be employed. For producing a record of the tuning condition of a single receiver such as 10, only eight contacts 169 are provided, but for each additional receiver being logged and recorded on the same film 143 five additional contacts are necessary. As illustrated, the conductor 68 included in cable 17 is grounded at the commutator switch, while the conductor 67 is connected to the contact 169*d*, the conductor 110 to the contact 169*e*, the conductor 111 to the contact 169*f*, the conductor 112 to the contact 169*g*, and the conductor 113 to the contact 169*h*. If there were additional receivers, the conductors corresponding to those included in cable 17 would be connected to additional contacts 169** in a manner well understood by those skilled in the art.

To provide a source of power for various purposes in the recorder 20, there is connected to the conductors 167 a suitable transformer 170 having its primary winding 171 connected in parallel with the one r.p.m. motor 160. The secondary winding of the transformer 170, designated by the reference numeral 172, is a center tapped winding, to the center tap of which a conductor 173 is maintained at ground potential by virtue of the ground connection 174. The other terminals of the secondary winding 172 are connected through suitable rectifiers **174*a* and 175 to a common terminal 176 which effectively comprises the positive rectifier output terminal. Actually, the output voltage at terminal 176 comprises an unfiltered full wave rectifier voltage, which is sometimes termed a folded alternating current voltage wave and this is essential for proper operation. Such a folded alternating current voltage output at terminal 176 is supplied to the plate circuit of the thyratron amplifier 23, so that it is immaterial what the phase of the signal from the receiver attachment might be; in other words, so that it is immaterial how the plug connector 36** is plugged into the socket. A true direct current voltage would eliminate the polarity problem, but there would be no voltage zero provided to extinguish current flow through the thyratron amplifier described hereinafter.

It has been found desirable to apply time information to the recording medium 143, and so-called minute marks "MM" have been found to be very desirable. To this end one terminal of the secondary winding 172 of the transformer 170 is connected through a suitable voltage dropping resistor 177 and a conductor 178 with the contact **169*b*. Thus, an alternating potential is continuously applied to contact 169*b* at all times, and once each minute when rotating contact arm 162 engages contact 169*b* a potential is available for energizing lamp 24**.

It was pointed out above that by virtue of relatively low voltages available at the output of the decimal-to-binary converter, suitable means in the form of a thyratron amplifier 23 were necessary to energize the lamp 24. The thyratron amplifier is illustrated as comprising an electron discharge valve 179, comprising an anode 180, a cathode 181, a control electrode 182, and a shield grid 183. The plate circuit including the anode 180 of the thyratron amplifier 23 is connected through a suitable current limiting resistor 184 and the contacts **185*a* of a relay 185 to the positive terminal 176 of the folded alternating current voltage through the lamp 24. For establishing a predetermined cathode bias, the cathode 181 of the electron discharge valve 179 is connected to ground through a suitable fixed resistor 187 and an adjustable resistor 188, and through the series resistors 189 and 190 to the positive terminal 176, the resistors 187, 188, 189 and 190 forming a voltage divider network between terminal 176 and ground 174. The shield grid 183 is connected to the cathode 181 through a suitable current limiting resistor 191. The control electrode 182 of the thyratron amplifier 23, on the other hand, is connected through a suitable resistor 193, a control switch 194 and a resistor 195 with the rotating arm 162 of the commutator switch 21. When the switch 194** is closed, as indicated in Fig. 2*b* of the drawings, the potential applied to the contact **169*b* through conductor 178 will cause thyratron 179 to fire once each minute as rotating arm 162 engages contact 169*b*. The resistor 188 is adjusted for the proper setting, so that the undesired voltages from the decimal-to-binary converter 16 will not cause the thyratron 179** to fire.

Due to the fact that extensive experiments have indicated that power outages occur at least once per month in sixty percent of the homes where wave signal receivers are being monitored, suitable means must be provided to produce a correct time record. To this end the mechanical time marker 141 referred to above is provided, which may be identical with the arrangement disclosed and claimed in copending Krahulec application, Serial No. 237,913, filed July 21, 1951, and assigned to the same assignee as the present application, now Patent No. 2,801,-896. This mechanical time marker 141 comprises a mechanical clock, only the spring 198 of which is disclosed in Fig. 2*b* of the drawings. This mechanical clock includes winding means in the form of an electric motor 199 which is connected directly to the spring 198 by means of a shaft 200 for winding the spring 198. This winding motor may be a synchronous motor, although a synchronous motor is obviously unnecessary, any other motor being satisfactory. As illustrated, the winding motor 199 is connected by suitable conductors to the power supply conductors 167, which also supply the motor 160 and the transformer 170. As illustrated, the motor 199 will continually wind spring 198 and, obviously, a suitable slipping clutch or the like might be interposed to prevent overwinding. Circuit control means may be provided whereby motor 199 is connected to the power source for a few minutes during each hour to wind the spring 198. Instead of a clutch arrangement, the motor 199 may be of a type which may be stalled for the major portion of the time without damage thereto and which only operates when the spring 198 is sufficiently unwound to permit additional winding thereof.

To supply the desired time information controlled by the mechanical clock of the mechanical time marker 141, this mechanical clock preferably actuates three rotary switches: an hour switch designated as 201, a day or twenty-four hour switch designated as 202, and a week or seven day switch designated as 203. The hour switch is preferably of the type that will cause the switch arm 201 to be in engagement with a contact **201*a* for the major portion of the hour, and to momentarily engage the contact 201*b* for a short period at the end of each hour. Similarly, the day switch arm 202 engages a contact 202*a* for the major portion of the day, and for an interval of less than an hour at the end of the day engages the contact 202*b*. Likewise, the week switch arm 203 engages a contact 203*a* for the major portion of the week, but for a period of less than twenty-four hours at the end of the week engages a contact 203*b*. It has been found desirable to provide unique time information on the record receiving element 143, and to this end the contact 169*a*, which might be called the hour contact, is connected by means of a conductor 205 with the contacts 202*a* and 203*b* of the mechanical time marker 141. Also, the switch arm 201 is connected by a conductor 207 with one terminal of the resistor 177 thereby to apply power to the switch arms of the mechanical time marker. With this arrangement it will be apparent that at the end of every hour, with one exception discussed hereinafter, when the contact arm 201 engages contact 201*b* a potential will be applied through the conductor 205 to the contact 169*a* whereby the thyratron amplifier 23 will cause lamp 24 to be energized to produce the hour mark "HM." The exception will occur only at the end of every day or the twenty-fourth hour when the contact arm 202 is in engagement with contact 202*b*. This will disconnect the conductor 205 from the power source, and once each day the hour mark will be omitted. This will enable one to look at a record and in the event of a power outage be able to determine what portion of the day was involved before and after the power outage occurred. It is also desirable to apply twenty-four hour marks to the recording element 143, and to this end the contact 202*b* of the mechanical time marker 141 is connected by means of a conductor 209 with the contact 169*c* of the commutator switch 121. Thus, at the end of every day when the hour arm 201 engages contact 201*b*, and the day arm 202 engages contact 202*b*, a day mark "DM" will be applied to the record receiving element 143 for the time that rotating arm 162 engages contact 169*c*. There will, however, be one exception to that, namely, at the end of every week the day mark will be eliminated. This is because at the end of the week, week arm 203 will engage contact 203*b*. At this time, however, an indication will be provided in the hour mark space by virtue of the fact that contact 203*b* is also connected to conductor 205**. Thus, a time record will be provided in which a mark is produced every hour except the twenty-fourth hour of the day, and a twenty-four hour mark is provided every day except the seventh day of the week, with one further exception in that on the seventh day of the week there is no omission of the hour mark. This unique time information permits one to orientate a record tape into its proper time position even though a power outage has occurred, and permitting one to use substantially all of the recorded information.

To take care of power outage conditions, the power outage indicator 140 has been provided, which merely comprises the relay 185, having normally open contacts **185*a* and normally closed contacts 185*b*. The relay 185 is indicated as being energized from the power conductors 167, and is indicated in its energized position with the contacts 185*a* closed and the contacts 185*b* open. This relay is a time delay relay requiring about two or three minutes to close its contacts 185*a* and open its contacts 185*b* when it is initially energized. It is preferably an instantaneous drop out relay. The normally closed contacts 185*b* are connected in a circuit putting the lamp 24** directly across the power source. This can readily be observed from Fig. 2*b* of the drawings, where the power terminal 176 is connected to one terminal of the lamp 24, and the other terminal of the lamp 24 is connected through the contacts **185*b* directly to the ground terminal 174. Thus, following a power outage, the contacts 185*b* will remain closed for two or three minutes, and during this time lamp 24 will be continuously energized for two or three minutes, which will permit two or three revolutions of the shutter disk 25 and will provide a unique record on film 143**, immediately indicating a power outage.

It was pointed out above that the voltage output of the decimal-to-binary converter was a relatively small voltage of less than twenty volts, and to eliminate any problem of failure to break down any resistance film between the rotating contact arm 162 and the contacts 169, there has been provided what is termed a voltage injection circuit which applies a predetermined high direct current potential to the switch contacts of the commutator switch 21. The voltage injection circuit described hereinafter forms no part of the present invention, but is disclosed and claimed in a copending application of Andrew A. Mueller, Patent No. 2,758,223, granted August 6, 1956, and assigned to the same assignee as the present application. To this end a suitable voltage divider comprising resistances 212 and 213 is connected between one terminal of the secondary winding 172 of the transformer 170 and ground, and by means of a rectifier 214 a negative potential of the order of one hundred volts is obtained at terminal 215. A suitable smoothing capacitor 216 is connected between the terminal 215 and ground 174. This high negative potential is connected by means of a conductor 217 and a high voltage dropping resistance 218 to the rotating contact arm 162 through the switch 194 and the resistor 195. The resistor 218 preferably has a resistance value about one thousand times greater than the resistance of resistor 195. Moreover, the resistance of resistor 195 is about the order of magnitude of the output impedance of the decimal-to-binary converter 16. Thus, as long as no current flows through the rotating arm 162, a relatively high negative voltage is applied to the rotating contact arm 162 which adds to the smaller positive potential present at the contacts 169. The sum of these voltages breaks down any resistance film that might be involved. Just as soon as any current flows, however, the drop across resistor 218 is so large that only a very small voltage, actually but a fraction of the output voltage of the converter 16, is applied by the voltage injection circuit so as not to interfere with the operation of thyratron 179.

In view of the detailed description included above, the operation of the present invention will readily be understood and no further discussion thereof is included herewith. As the rotating switch arm 162 rotates and successively engages the contacts 169*e*, 169*f*, 169*g* and 169*h*, code indications will be applied to the record tape 143 in binary code representative of the tuning condition of the receiver 10. The indication produced on the record tape by virtue of contact 169*d* indicates that receiver 10 is turned on, even though it may not be tuned to any of the fifteen channels provided for in the recorder 20. The low voltage output of the decimal-to-binary converter 16 through the thyratron amplifier readily operates the lamp. At the same time the very low voltage introduces no fire or shock hazards, and the cable 17, with great safety, may be placed anywhere. Additionally, with completely passive impedance elements, there is provided a foolproof arrangement with none of the possible ambiguities that might arise if rotating code switches were employed. With the present invention, information from all the receivers in a single home can readily be recorded on a single film whereby the collaborator in replacing magazines containing the film can make no mistake with respect to associating the proper magazine with the proper recorder, since only one magazine is involved.

While there has been illustrated and described a particular embodiment of the present invention, it will be apparent that various changes and modifications will readily occur to those skilled in the art. Accordingly, it is aimed in the appended claims to cover all such changes and modifications as fall within the true spirit and scope of the present invention.

What is claimed as new and desired to be secured by Letters Patent of the United States is:

1. A converting grid comprising a first plurality of conductors, each of said conductors being representative of a decimal numerical notation, a second plurality of conductors, each of said second plurality of conductors being connected to a different one of a plurality of first electrically passive linear elements, a plurality of second electrically linear passive elements interconnecting said first and second pluralities of conductors in different coded permutations, said permutations being of a binary significance, a source of voltage comprising a current limiting isolating transformer capable of being shorted without causing any fire or arc damage, and means for connecting one of said first plurality of conductors and said first electrically passive linear elements to said source of voltage to energize a selected number of said first and second passive elements whereby said energized elements form a selected number of voltage dividers for energizing a selected number of said second plurality of conductors in accordance with the binary notation corresponding to the decimal notation identifying the energized one of said first plurality of conductors.

2. A converting grid comprising a first group of conductors, a second group of conductors, a plurality of first electrically responsive linear elements connected between said second group of conductors and a source of voltage of reference level, a plurality of second electrically responsive linear elements connected between said first and second groups of conductors in different coded permutations, said permutations being of a binary significance so that a unique set of said second group of conductors are connected by said linear elements to each conductor in said first group of conductors, and means for selectively connecting respective ones of said first group of conductors to a source of voltage having a level different from said reference level, whereby the voltages respectively developed on said second group of conductors provides a binary indication of the selectively energized one of said first group of conductors.

3. A converting grid as set forth in claim 2 wherein said first electrically responsive linear elements are resistive impedances.

4. A matrix for converting individual representations of electrical signals into binary representations, comprising a first group of conductors respectively representing a group of integers, a second group of conductors representing respective digits in a binary system of numbers, a first group of impedances connecting said second group of conductors to a source of voltage of reference level, a second group of impedances respectively connecting said first group of conductors to the ones of said second group of conductors which represent the binary number corresponding to the associated one of said first group of conductors, and means for selectively connecting the one of said first group of conductors corresponding to the number to be converted to a source of voltage having a level different from said reference level, whereby the electrical voltages developed on said second group of conductors provide a binary representation of the one of said first group of conductors which is selected.

References Cited in the file of this patent

UNITED STATES PATENTS

| | | |
|---|---|---|
| 1,955,043 | Yates et al. | Apr. 17, 1934 |
| 2,476,389 | Schmidt | July 19, 1949 |
| 2,532,731 | Putter | Dec. 5, 1950 |
| 2,630,562 | Johnson | Mar. 3, 1953 |
| 2,643,172 | Reiss | June 23, 1953 |
| 2,657,856 | Edwards | Nov. 3, 1953 |
| 2,660,663 | Rahmel | Nov. 24, 1953 |
| 2,676,085 | Freeman | Apr. 20, 1954 |
| 2,697,549 | Hobbs | Dec. 21, 1954 |
| 2,751,449 | Krahulec et al. | June 19, 1956 |